(12) United States Patent
Federico (10) Patent No.: US 10,145,054 B2
(45) Date of Patent: Dec. 4, 2018

(54) CLOTHES DRYER VENT QUICK COUPLING APPARATUS (71) Applicant: Wayne E. Federico, Myrtle Beach, SC (US)

(72) Inventor: Wayne E. Federico, Myrtle Beach, SC (US)

( * ) Notice: Subject to any disclaimer, the term of this patent is extended or adjusted under 35 U.S.C. 154(b) by 336 days.

(21) Appl. No.: 15/167,159

(22) Filed: May 27, 2016

(65) Prior Publication Data
US 2016/0355970 A1 Dec. 8, 2016

Related U.S. Application Data
(60) Provisional application No. 62/172,133, filed on Jun. 7, 2015.

(51) Int. Cl.
D06F 58/20 (2006.01)
F16L 37/26 (2006.01)
F16L 55/24 (2006.01)

(52) U.S. Cl.
CPC .............. D06F 58/20 (2013.01); F16L 37/26 (2013.01); F16L 55/24 (2013.01)

(58) Field of Classification Search
CPC ............ D06F 58/20; F16L 37/26; F16L 55/24
See application file for complete search history.

(56) References Cited

U.S. PATENT DOCUMENTS

| 5,257,468 | A | * | 11/1993 | Lebrun | ................... D06F 58/00 |
|           |   |   |         |        | 285/189 |
| 5,318,328 | A |   | 6/1994 | Dawson | |
| 6,195,910 | B1 |  | 3/2001 | Robineau | |
| 6,463,673 | B1 |  | 10/2002 | Gherna | |
| 9,227,095 | B2 |  | 1/2016 | Tamburro | |
| 2002/0149201 | A1 | | 10/2002 | Pichotta | |
| 2004/0237330 | A1 | * | 12/2004 | Fuller | ..................... D06F 58/20 |
|              |    |   |         |        | 34/140 |

* cited by examiner

Primary Examiner — Jessica Yuen
(74) Attorney, Agent, or Firm — PatentFile, LLC; Bradley C. Fach; Steven R. Kick (57) ABSTRACT In some embodiments, a clothes dryer vent quick coupling apparatus may include a male element and a female element which may be removably coupled together. The male element may include a body having a male vent aperture in fluid communication with a first hose coupling, a male inlet surface, a male outlet surface, and a handle. The first hose coupling may be disposed on the male inlet surface and the male vent aperture may extend through the body between the male outlet surface and the first hose coupling. The female element may include a receiver having a channel with a female inlet surface and a female outlet surface. A female vent aperture may be in fluid communication with the female outlet surface and may extend from the channel through the receiver. Optionally, the handle may comprise a hollow cavity which may be in fluid communication with the male vent aperture.

20 Claims, 6 Drawing Sheets

CLOTHES DRYER VENT QUICK COUPLING APPARATUS

CROSS REFERENCE TO RELATED APPLICATIONS

This application claims priority to and the benefit of the filing date of U.S. Provisional Application No. 62/172,133, filed on Jun. 7, 2015, entitled "CLOTHES DRYER VENT QUICK COUPLING APPARATUS", which is hereby incorporated by reference in its entirety.

FIELD OF THE INVENTION

The present invention relates to commercial and domestic clothes dryers and accessory devices. More specifically, the invention relates to coupling devices for quickly manipulating a dryer vent hose.

BACKGROUND

Commercial and domestic clothes dryers are known to comprise a vent hose which is used to direct hot air from the dryer through an exhaust conduit and ultimately to the exterior of the building through a building exterior vent hood. Dryer vent hoses often are made from a metal, foil, or plastic accordion-style ducting material which is readily expanded, contracted, and made to conform to a plurality of angles allowing a flexible connection method between the dryer vent and the building exterior vent hood. While this flexible connection method is easy to install by the average handyman, it also can result in dangerous scenarios.

While the air initially passing through the accordion-style vent hose tend to be damp, as the drying cycle completes the air becomes very hot, dry, and laden with clothes lint. The lint easily accumulates in the folds and bends of the accordion-style vent hose. These accumulations limit the ability of the hot air to escape and are very flammable. Many buildings are damaged by fires that originated from accumulated clothes lint that was ignited in accordion-style hoses.

The length of the accordion-style dryer hose can also be an aggravating factor for lint accumulation. As dryers are positioned close to walls in order to align their vents with the building vent and to maximize the usable space in front of the dryer. For this reason the dryer hose must be longer than needed. The hose must expand when the dryer is away from the wall so that a person can fit between the wall and the dryer to connect and disconnect the hose to the dryer vent and building exterior vent hood, and then the hose must contract as the dryer is brought closer to the wall. The excess amount of hose required to provide expansion also increases the number of accordion folds in the hose further increasing the amount of lint that may become trapped in the hose and the chances for it to ignite.

Periodic cleaning of all dryer vent hoses is required to ensure that clothes lint does not accumulate within them. While the accordion-style dryer hoses are quickly and easily attached to the clothes dryer vent and building vent, disconnecting them for cleaning can be very troublesome. In order to disconnect them, the dryer often must be moved from its location adjacent to a wall to allow access to the hose. Not only is moving a dryer a physically intensive task, but it may result in wear and tear damage to the floor, dryer vent, and building exterior vent hood.

Therefore, a need exists for clothes dryer vent apparatuses configured for manipulating a dryer vent hose. There also exists a need for clothes dryer vent apparatuses that are able to minimize the length of dryer hose required to connect the vent of a dryer to a building exterior vent hood. There is a further need for clothes dryer vent apparatuses that allow a dryer vent hose to be quickly connected and disconnected for cleaning and lint removal without requiring movement or excessive movement of the dryer. Finally, there exists a need for clothes dryer vent apparatuses that are able to allow inspection of lint in the vent hose and that allow lint to be removed from the vent hose without disconnecting the vent hose or moving the dryer.

BRIEF SUMMARY OF THE INVENTION

A clothes dryer vent quick coupling apparatus is disclosed which may be configured to allow a user to easily and quickly manipulate a dryer vent hose into and out of fluid communication with an exhaust conduit. In some embodiments, the apparatus may include a male element and a female element which may be removably coupled together. The male element may include a body having a male vent aperture in fluid communication with a first hose coupling, a male inlet surface, a male outlet surface, and a handle. The first hose coupling may be disposed on the male inlet surface of the body and the male vent aperture may extend through the body between the male outlet surface and the first hose coupling. The female element may include a receiver having a channel with a female inlet surface and a female outlet surface. A female vent aperture may be in fluid communication with the female outlet surface, and the female vent aperture may extend from the channel through the receiver. The male element and the female element may be removably coupled together by inserting the body into the channel so that the female inlet surface may be brought into contact with the male outlet surface. In this manner, the first hose coupling of the male element may be brought into fluid communication with the female vent aperture of the female element when the male vent aperture may be aligned with the female vent aperture by bringing the male outlet surface into contact with the female outlet surface as the body of the male element is inserted into the channel of the female element.

In further embodiments, the handle of the apparatus may include a first upper end and a second lower end with a cavity which is open at the first upper end and joined to the male element at the second lower end. The cavity may be coupled to the male vent aperture so that the cavity may be in fluid communication with the male vent aperture. The fluid communication may allow for the attachment of portions of a vacuum hose such as common to a shopvac, vacuum cleaner, or other vacuuming device, or a blower or other air forcing device with the first open end so that, air may be forced to travel through the male vent aperture of the male element, through the hollow interior cavity of the handle, and out of the handle allowing lint and other debris to be removed from the male element and optionally from a female element engaged to the male element by the vacuuming device or blower.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

New clothes dryer vent quick coupling apparatuses are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
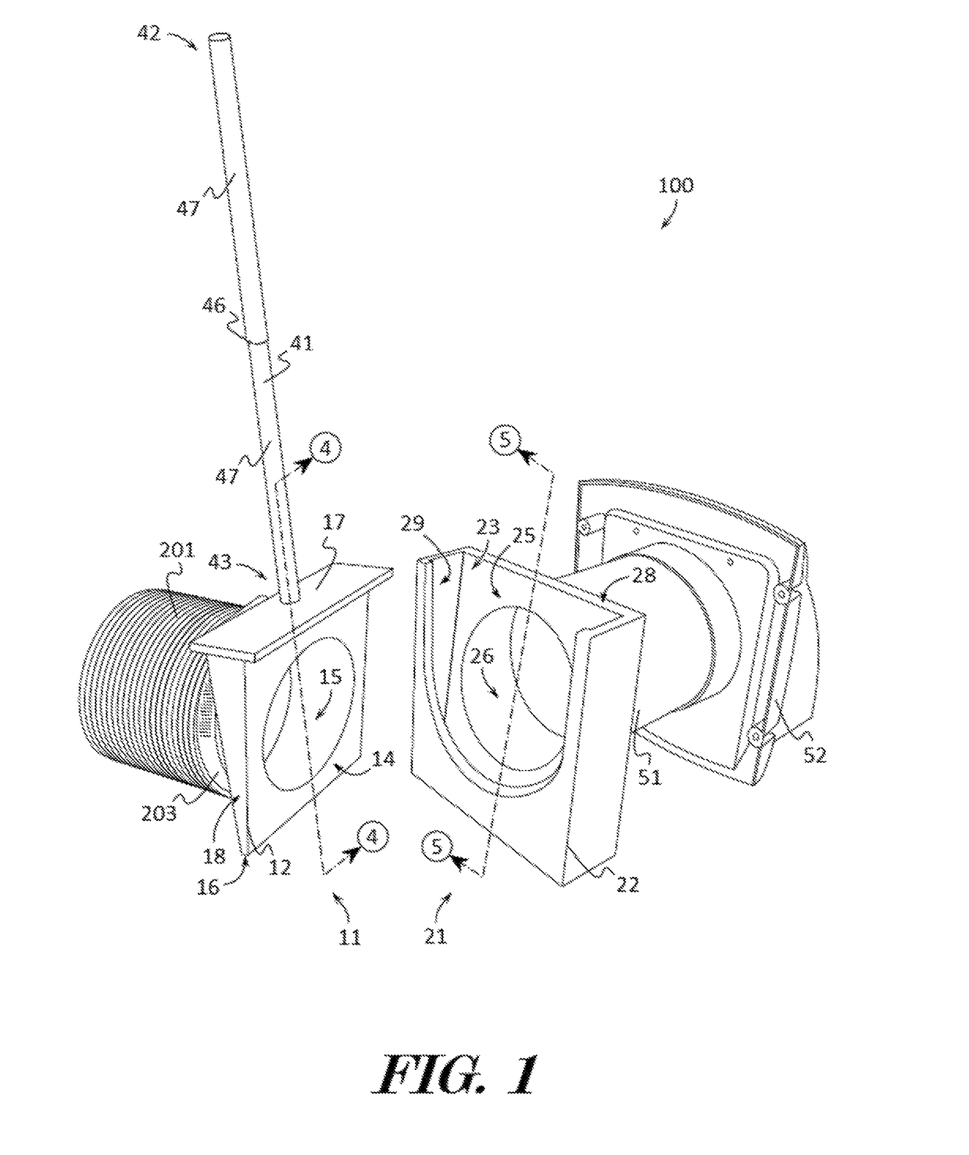
FIG. 1-FIG. 1 depicts a perspective view of an example of a clothes dryer vent quick coupling apparatus according to various embodiments described herein.

The present invention will now be described by example and through referencing the appended figures representing preferred and alternative embodiments. FIG. 1 illustrates an example of a clothes dryer vent quick coupling apparatus ("the apparatus") 100 according to various embodiments. In this and some embodiments, the apparatus 100 may comprise a male element 11 and a female element 21 which may be removably coupled together. The male element 11 may include a body 12 having a male vent aperture 15 in fluid communication with a first hose coupling 31, a male inlet surface 13, a male outlet surface 14, and a handle 41. The first hose coupling 31 may be disposed on the male inlet surface 13 of the body 12 and the male vent aperture 15 may extend through the body 12 between the male outlet surface 14 and the first hose coupling 31. The female element 21 may include a receiver 22 having a channel 23 with a female inlet surface 24 and a female outlet surface 25. A female vent aperture 26 may be in fluid communication with the female outlet surface 25, and the female vent aperture 26 may extend from the channel 23 through the receiver 22.

The male element 11 and the female element 21 may be removably coupled together by inserting the body 12 into the channel 23 so that the female inlet surface 24 may be brought into contact with the male outlet surface 14. In this manner, the first hose coupling 31 of the male element 11 may be brought into fluid communication with the female vent aperture 26 of the female element 21 when the male vent aperture 15 may be aligned with the female vent aperture 26 by bringing the male outlet surface 14 into contact with the female outlet surface 25 as the body 12 of the male element 11 is inserted into the channel 23 of the female element 21.

In some embodiments, the body 12 of the male element 11 and the receiver 22 of the female element 21 may be formed from a substantially rigid material such as steel alloys, aluminum, any other type of metal or metal alloy, various types of hard plastics, such as nylon, acrylic, uPVC, HDPE, melamine, hard rubbers, fiberglass, carbon fiber, resins, such as epoxy resin, or any other material including combinations of materials that are substantially rigid and enduring heat and moisture common to venting applications.

In some embodiments, a male element 11 may be configured to be attached to a flexible vent hose 201 by placing a portion of an end of the flexible vent hose 201 in contact with the first hose coupling 31 that allows the interior of the flexible vent hose 201 to be aligned and joined with the male vent aperture 15 of the male element 11. In preferred embodiments, a first hose coupling 31 may be formed by a lip which may extend around the male vent aperture 15 of the male element 11 that is coupled to the male inlet surface 13 and which may be configured to receive or otherwise engage a portion of the end of a flexible vent hose 201. The flexible vent hose 201 may then be secured to the first coupling 31 with a hose clamp 203, such as a screw/band clamp or Worm Gear clamp, a spring clamp, a wire clamp, an ear clamp, or any other suitable connection device or method including with adhesive, chemical bonding, heat bonding, and the like.

In some embodiments, the female element 21 may comprise a second hose coupling 32 coupled to the receiver 22 which may be in fluid communication with the female vent aperture 26. In preferred embodiments, a second hose coupling 32 may be formed by a lip which may extend around the female vent aperture 26 of the female element 21 which may be configured to receive or otherwise engage a portion of the end of a flexible vent hose 201, exhaust conduit 51, or the like. A flexible vent hose 201, exhaust conduit 51, or the like may then be secured to the second coupling 32 with a hose clamp 203, such as a screw/band clamp or Worm Gear clamp, a spring clamp, a wire clamp, an ear clamp, or any other suitable connection device or method including with adhesive, chemical bonding, heat bonding, and the like.

In other embodiments, a first 31 or second 32 hose coupling may be coupled to a flexible vent hose 201 or an exhaust conduit 51 by a temporary joining or connection method such as a threaded screw type connection method, a push-to-lock type connection method, a turn-to-lock type connection method, a slide-to-lock connection method, or any other suitable temporary connection method as one reasonably skilled in the art could envision to serve the same function. In further embodiments, a first 31 or second 32 hose coupling may be joined to a venting conduit, such as a flexible vent hose 201, an exhaust conduit 51, or the like, by a substantially permanent joining method such as heat bonding, chemical bonding, adhesives, clasp type fasteners, threaded fasteners, other types of fasteners, by being integrally molded or formed together, or any other suitable joining method capable of securing portions of a first 31 or second 32 hose coupling to a venting conduit.

In some embodiments, the apparatus 100 may comprise an exhaust conduit 51 which is coupled in fluid communication to the female vent aperture 26. An exhaust conduit 51 may be a type of venting conduit which is configured to fluidly conduct air, gasses, atmosphere, and the like from one location to another through its hollow interior. Optionally, an exhaust conduit 51 may comprise a generally rigid or flexible venting conduit of the type used to pass through the walls of buildings to receive the exhaust from a clothes dryer or other appliance configured with an exhaust vent. In further embodiments, an exhaust conduit 51 may be coupled in fluid communication to the female vent aperture 26 by coupling the exhaust conduit 51 to a second hose coupling 32 which is in fluid communication to the female vent aperture 26. In alternative embodiments, an exhaust conduit 51 may be coupled in fluid communication to the female vent aperture 26 by coupling the exhaust conduit 51 onto or over the female vent aperture 26 and directly to the receiver 22. An exhaust conduit 51 may be coupled to a second hose coupling 32 or to the receiver 22 with any suitable coupling method such as disclosed herein.

In some embodiments, the apparatus 100 may comprise a building exterior vent hood 52 which may be coupled in fluid communication with the female vent aperture 26. A building exterior vent hood 52 may be a type of venting conduit which is configured to fluidly conduct air, gasses, atmosphere, and the like through the exterior of a building. Generally, a building exterior vent hood 52 may comprise a covering configured to let exhaust pass through the building exterior vent hood 52 while preventing precipitation and/or pests from entering. Optionally, a building exterior vent hood 52 may comprise a generally rigid or flexible venting conduit of the type used in buildings to receive the exhaust from an exhaust conduit 51. In further embodiments, a building exterior vent hood 52 may be coupled in fluid communication to the female vent aperture 26 by coupling the building exterior vent hood 52 to a second hose coupling 32 and/or exhaust conduit 51 which is in fluid communication to the female vent aperture 26. In alternative embodiments, building exterior vent hood 52 may be coupled in fluid communication to the female vent aperture 26 by coupling the building exterior vent hood 52 onto or over the female vent aperture 26 and directly to the receiver 22. A building exterior vent hood 52 may be coupled to a second hose coupling 32, exhaust conduit 51, or to the receiver 22 with any suitable coupling method such as disclosed herein.

Referring now to FIGS. 1, 2, 4, and 5, the body 12 of the male element 11 may comprise a male inlet surface 13 and an opposing male outlet surface 14. In preferred embodiments, the body 12 may be generally triangular prism or wedge shaped with both the male inlet surface 13 and the male outlet surface 14 being planar in shape. The planar male inlet surface 13 may be angled relative to the planar male outlet surface 14. The female element 21 may comprise a receiver 22 which includes a triangular prism shaped channel 23 having a planar female inlet surface 24 and a planar female outlet surface 25. The planar female inlet surface 24 may be angled relative to the planar female outlet surface 25 generally the same angle as the planar male inlet surface 13 is angled relative to the planar male outlet surface 14 of the male element.

To removably couple the male element 11 and the female element 21 together, the triangular prism shaped portions of the male element 11 may be inserted into the complementary triangular prism shaped portions of the female element 21 which form the channel 23 thereby aligning the male vent aperture 15 with the female vent aperture 26. In this manner, the first hose coupling 31 of the male element 11 may brought into fluid communication with a second hose coupling 32 of the female element, and therefore with an exhaust conduit 51 and/or building exterior vent hood 52, when the male vent aperture 15 is aligned with the female vent aperture 26 by bringing the planar male outlet surface 14 into contact with the planar female outlet surface 25 as the triangular prism shaped portion of the body 12 of the male element 11 is inserted into the triangular prism shaped channel 23 of the female element 21.

Figure 2:
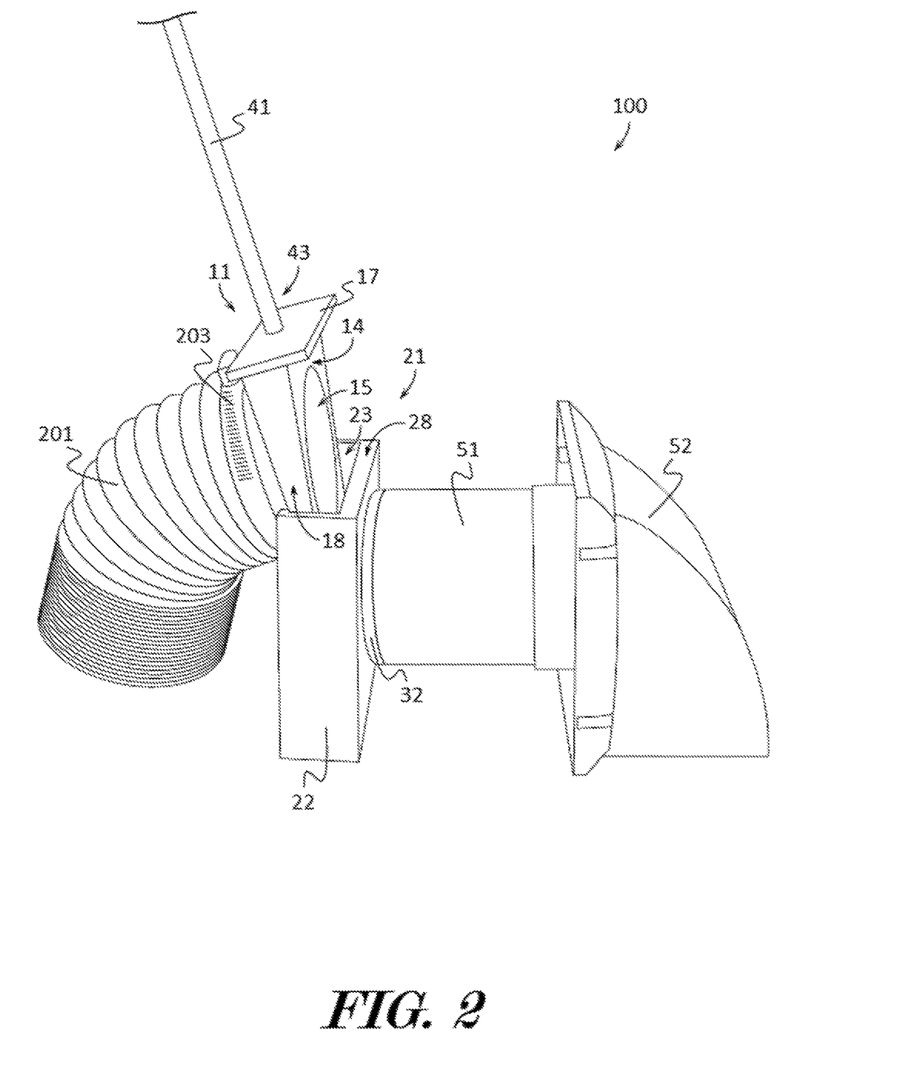
FIG. 2-FIG. 2 illustrates perspective view of an example of a clothes dryer vent quick coupling apparatus according to various embodiments described herein.
Figure 3:
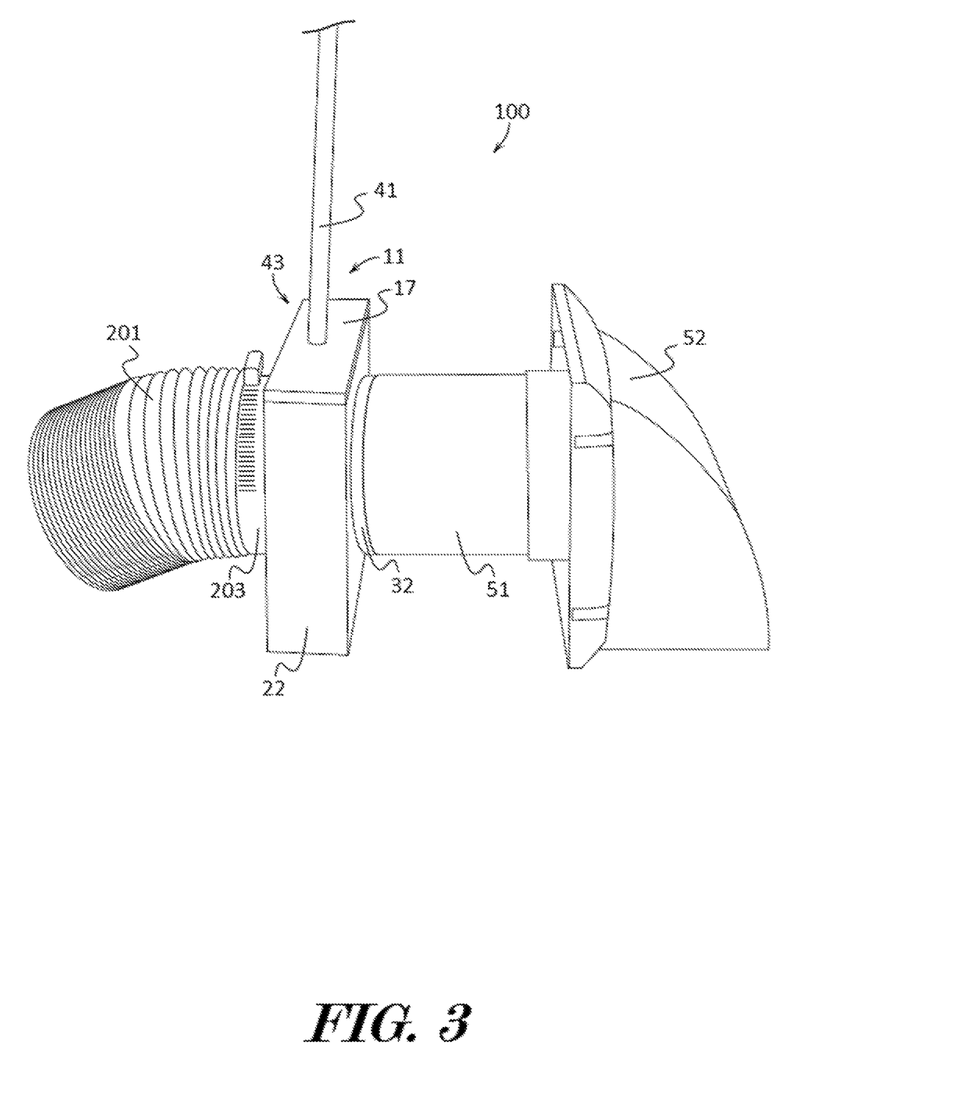
FIG. 3-FIG. 3 shows a perspective view of an example of a clothes dryer vent quick coupling apparatus according to various embodiments described herein.
Figure 4:
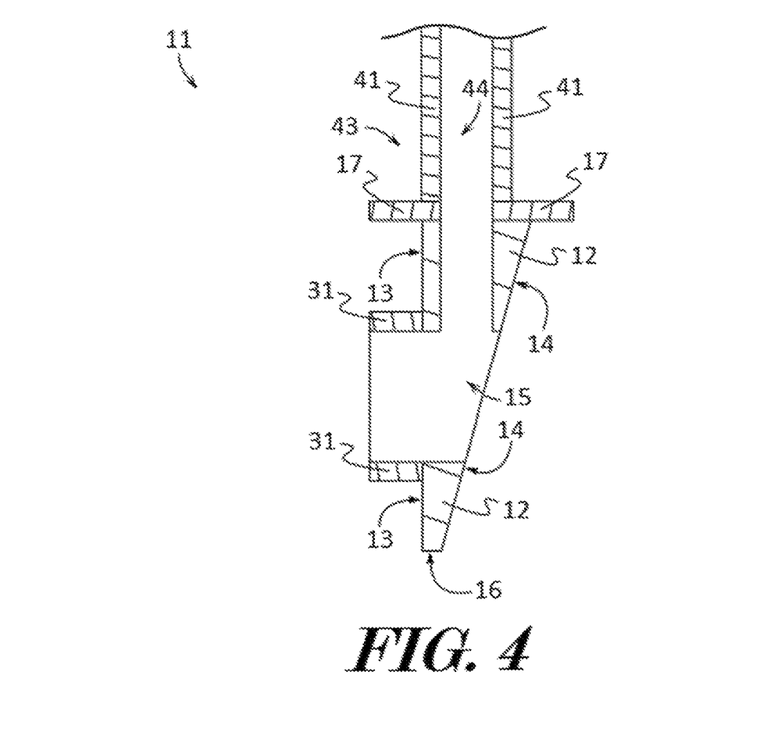
FIG. 4-FIG. 4 depicts a sectional, through line 4-4 shown in FIG. 1, elevation view of an example of a male element according to various embodiments described herein.
Figure 5:
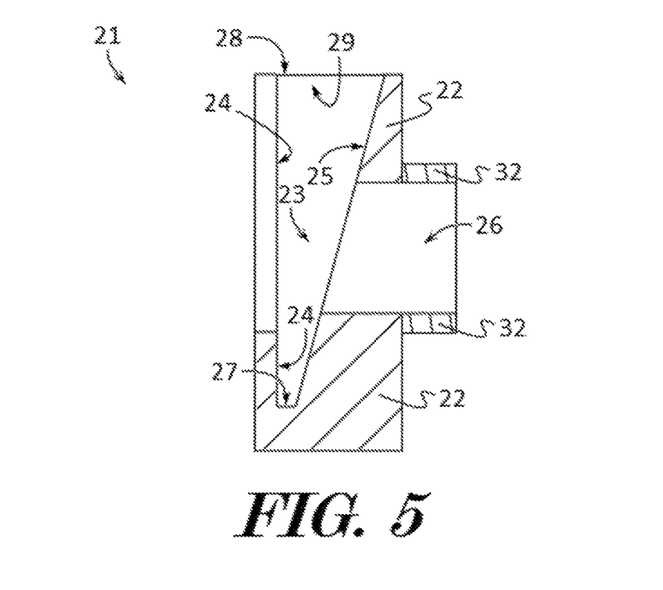
FIG. 5-FIG. 5 illustrates a sectional, through line 5-5 shown in FIG. 1, elevation view of an example of a female element according to various embodiments described herein.

In preferred embodiments, a flexible vent hose 201, which may be connected to a clothes dryer or other appliance configured with an exhaust vent, may be coupled to the first hose coupling 31 of the male element 11. Also in preferred embodiments, an exhaust conduit 51, optionally coupled to a building exterior vent hood 52, may be coupled to the female element 21 so that the exhaust conduit 51 is in fluid communication with the female vent aperture 26. By removably coupling the male element 11 and female element 21 together, the exhaust exiting the clothes dryer or other appliance may be communicated through the flexible vent hose 201 through the vent apertures 15, 26, and out through the building exterior vent hood 52. As seen in FIG. 2, by engaging a male element 11 with a female element 21, a flexible vent hose 201 may be quickly coupled to an exhaust conduit 51 allowing exhaust from an appliance to exit a structure through a building exterior vent hood 52 as shown in FIG. 3. By disengaging a male element 11 from a female element 21 similarly also shown in FIG. 2, the fluid communication between the vent apertures 15, 26, may be broken or disrupted, and a flexible vent hose 201 may be quickly uncoupled from an exhaust conduit 51 allowing easy cleaning and disconnection of the flexible vent hose 201 and exhaust conduit 51 as illustrated in FIG. 1.

As perhaps best shown in FIGS. 1-4, in some embodiments, the male element 11 may comprise a vertical limiter 17 and the female element 21 may comprise a limiting surface 28. The vertical limiter 17 may be coupled to the handle 41 and/or to the body 12. The limiting surface 28 may be formed on the receiver 22, such as above the channel 23. When portions of the male element 11, such as the inlet 13 and outlet 14 surfaces, are inserted into the channel 23, movement of the portions of the male element 11 into the channel 23 may be prevented when the vertical limiter 17 contacts the limiting surface 28 and the male vent aperture 15 may be vertically aligned with the female vent aperture 26.

Referring now to FIGS. 4, 5, 7, and 8. In some embodiments, the male element 11 may comprise a lower contact surface 16 and the female element 21 may comprise a terminal contact surface 27. In preferred embodiments, the lower contact surface 16 and the terminal contact surface 27 are configured to contact each other when portions of the male element 11, such as the inlet 13 and outlet 14 surfaces, are inserted into the channel 23. When the lower contact surface 16 and the terminal contact surface 27 are in contact, movement of the portions of the male element 11 into the channel 23 may be prevented and the male vent aperture 15 may be vertically aligned with the female vent aperture 26.

In some embodiments, the male element 11 may comprise one or more lateral body surfaces 18 (FIGS. 1, 2, and 6) which may be formed onto the body 11. Preferably, the body 11 may comprise two lateral body surfaces 18 coupled opposingly to the male inlet surface 13 to the male outlet surface 14. In further embodiments, the female element 21 may comprise one or more lateral channel surfaces 29 (FIGS. 1, 2, 5, 6, and 8) which may be formed on the receiver 22 within the channel 23. Preferably, the receiver 22 may comprise two lateral channel surfaces 29 coupled opposingly to the female inlet surface 24 to the female outlet surface 25. In further preferred embodiments, a lateral body surface 18 and lateral channel surface 29 are configured to contact each other when portions of the male element 11, such as the inlet 13 and outlet 14 surfaces, are inserted into the channel 23. When the lateral body surface 18 and the lateral channel surface 29 are in contact, horizontal movement of the portions of the male element 11 within the channel 23 may be prevented and the male vent aperture 15 may be horizontally aligned with the female vent aperture 26.

In some embodiments, the apparatus 100 may comprise a handle 41 which may be coupled to the male element 11, such as to the body 12 and/or to the vertical limiter 17. The handle 41 may be gasped by a user to allow the user to remotely couple and uncouple the male element 11 to the female element 21 without having to grasp or otherwise manipulate the elements 11, 21, directly. The handle 41 be configured in any desired length and preferably a length that is generally equal to or longer than a clothes dryer or other appliance to which the apparatus 100 may be connected to. For example, when the apparatus 100 is positioned behind a clothes dryer or other appliance, a user may grasp the handle 41 to remotely couple and uncouple the male element 11 to the female element 21 without having to first move the clothes dryer or other appliance.

Figure 6:
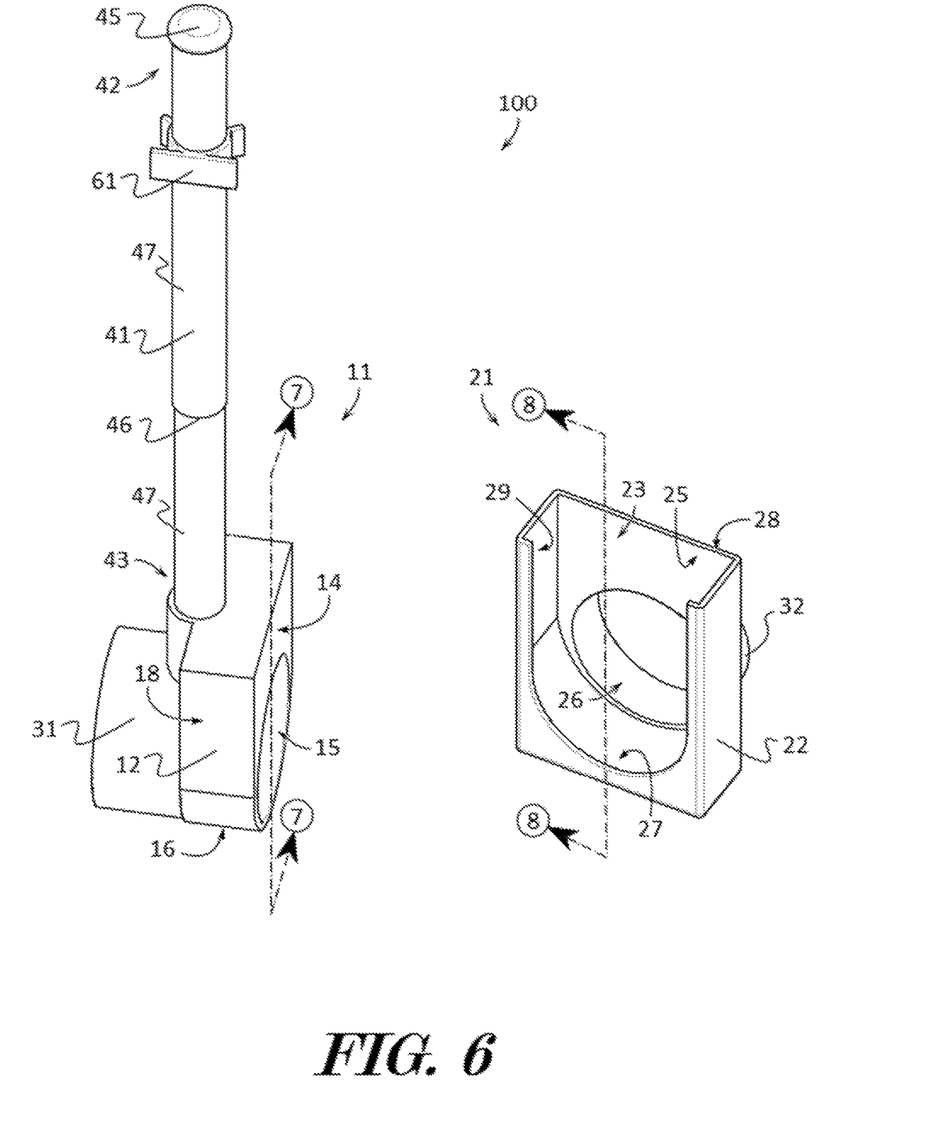
FIG. 6-FIG. 6 shows a perspective view of an alternative example of a clothes dryer vent quick coupling apparatus according to various embodiments described herein.

As shown in FIGS. 1 and 6, in some embodiments, the handle 41 may comprise one or more length adjustment couplings 46 and/or one or more sections 47. A length adjustment coupling 46 may allow the length of the handle 41 to be changed, such as by increasing or decreasing, In further embodiments, a length adjustment coupling 46 may allow the length of the handle 41 to be changed and also allow fluid communication between the first upper end 42 and the second lower end 43 to be maintained. Optionally, each section 47 may comprise cavity 44 or hollow interior which may provide the fluid communication from one section 47 to another. Two or more sections 47 may be coupled or joined together by one or more length adjustment couplings 46 and may be used to increase or decrease the length of the handle 41. For example, forming the handle 41 with a greater number of sections 47 coupled together with length adjustment couplings 46, the length of the handle 41 may be increased. By forming the handle 41 with a lesser number of sections 47 coupled together with length adjustment couplings 46, the length of the handle 41 may be decreased. In further embodiments, a length adjustment coupling 46 may comprise a threaded screw type connection method, a push-to-lock type connection method, a turn-to-lock type connection method, a slide-to-lock connection method, or any other suitable temporary connection method as one reasonably skilled in the art could envision to serve the same function. In still further embodiments, a length adjustment coupling 46 may allow one section 47 of a handle 41 to retract into or extend out of another section.

Turning now to FIGS. 1, 2, 3, 4, 6, and 8, in some embodiments, the handle 41 may comprise a first open upper end 42 and a second lower end 43. The first upper end 42 may be configured to be grasped by a user, and the second lower end 43 may be coupled to the male element 11, such as to the body 12 and/or to the vertical limiter 17. In further embodiments, the handle 41 may comprise a cavity 44 (FIGS. 4 and 7) which may form a substantially hollow interior and which may extend the length of the handle 41 from the first upper end 42 to the second lower end 43. In preferred embodiments, the cavity 44 may be coupled to the male vent aperture 15 so that the cavity 44 and the male vent aperture 15 may be in fluid communication with each other. The fluid communication may allow for the attachment or inserting portions of a vacuum hose of a vacuum such as a shop vacuum cleaner or shopvac, vacuum cleaner, or other vacuuming device, or a blower or other air forcing device with the first open end 42 so that, air may be forced to travel through the male vent aperture 15 of the male element 11, through the hollow interior cavity 44 of the handle 41, and out of the handle 41 allowing lint and other debris to be removed from the male element 11 and optionally from a female element 21 engaged to the male element 11 by the vacuuming device or blower. Conversely, by pulling up on the handle 41, the male element 11 may be uncoupled from the channel 23 of the female element 21 allowing the fluid communication between a coupled flexible vent hose 201, exhaust conduit 51, and/or building exterior vent hood 52 to be quickly uncoupled.

In further embodiments, the handle 41 may comprise a cap 45, lid, or other suitable covering which may be configured to govern access to the cavity 44 of the handle 41. A cap 45, lid, or other suitable covering may be temporarily joined to the handle 41 with a threaded screw type connection method, a push-to-lock type connection method, a turn-to-lock type connection method, a slide-to-lock connection method, or any other suitable temporary connection method as one reasonably skilled in the art could envision to serve the same function.

Figure 7:
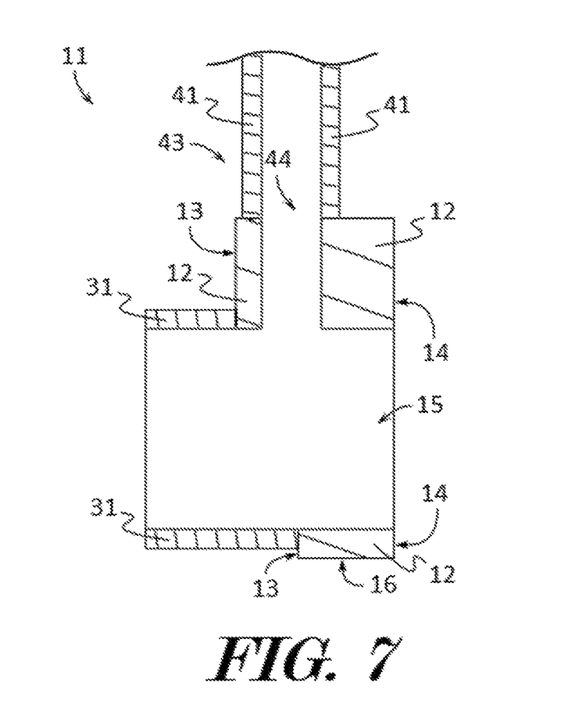
FIG. 7-FIG. 7 depicts a sectional, through line 7-7 shown in FIG. 6, elevation view of an alternative example of a male element according to various embodiments described herein.
Figure 8:
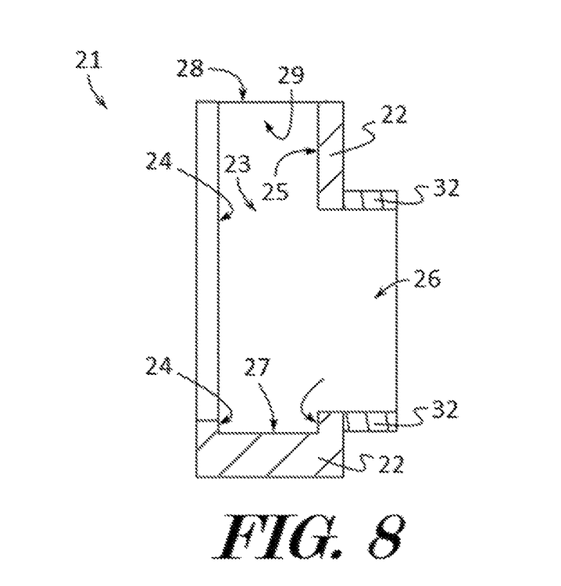
FIG. 8-FIG. 8 illustrates a sectional, through line 8-8 shown in FIG. 6, elevation view of an alternative example of a female element according to various embodiments described herein.

Turning now to FIGS. 6-8, a perspective view of an alternative example of a clothes dryer vent quick coupling apparatus 100 according to various embodiments is depicted. In this and some alternative embodiments, the body 12 may be generally rectangular prism shaped with both the male inlet surface 13 and the male outlet surface 14 being planar in shape and generally parallel to each other while the lateral body surfaces 18 may be parallel to each other and generally perpendicular to the male inlet 13 and outlet surfaces 14. The lower contact surface 16 may optionally be curved and shaped to extend away from the handle 41 and/or top of the male element 11. The female element 21 may comprise a receiver 22 which includes a generally rectangular prism shaped channel 23 having a planar female inlet surface 24 and generally parallel planar female outlet surface 25. The limiting surfaces 28 may be parallel to each other and generally perpendicular to the female inlet 24 and outlet surfaces 25, while the terminal contact surface 27 may comprise a curved shape that is complementary to the lower contact surface 16.

In further preferred embodiments, the channel 23 of the female element 21 is configured to be complementary in shape to portions of the body 12 of the male element 11 so that the male element 11 and the female element 21 may be coupled or secured to each other by sliding portions of the male element 11 into the channel 23 of the female element 21 allowing the vent apertures 15, 26, of the male element 11 and female element 21 to align. In further alternative embodiments, the male element 11 may comprise a cylinder shaped, cuboid shaped, hexagonal prism shaped, triangular prism shaped, or any other geometric or non-geometric shaped body 12 portions, while the female element 21 may comprise a channel 23 that is complementarily shaped to those portions of the body 12 of the male element 11 to slidably receive and secure the male element 11. It is not intended herein to mention all the possible alternatives, equivalent forms or ramifications of the invention. It is understood that the terms and proposed shapes used herein are merely descriptive, rather than limiting, and that various changes may be made without departing from the spirit or scope of the invention.

In further embodiments, a clip 61 or other attachment device such as a hook, clasp, magnetic catch, or any other suitable attachment method may be used to secure the handle 41 of a male element 11 to portions of a clothes dryer or other appliance to which the male element 11 may be attached to. The clip 61 may temporarily attach to the back, top, and/or side of a clothes dryer or other appliance and may be detached when coupling and uncoupling the male 11 and female 21 elements, moving the clothes dryer or other appliance, and for cleaning of the appliance and the appliance venting. Additionally, when attached to a clothes dryer or other appliance, the clip 61 may control or facilitate the control of the positioning of the male element 11 that is coupled to the handle 41 when moving the clothes dryer or other appliance.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A clothes dryer vent quick coupling apparatus, the apparatus comprising:
    a. a male element, wherein the male element comprises:
        a body having a planar male inlet surface and a planar male outlet surface;
        a first hose coupling in fluid communication with a male vent aperture, wherein the first hose coupling is disposed on the male inlet surface of the body, and wherein the male vent aperture extends through the body between the male outlet surface and the first hose coupling;
        a handle coupled to the body; and
    b. a female element, wherein the female element comprises:
        a receiver with a channel having a planar female inlet surface and a planar female outlet surface, wherein the planar female outlet surface is brought into contact with the planar male outlet surface when the body is inserted into the channel;
        a female vent aperture in fluid communication with the female outlet surface, wherein the female vent aperture extends from the channel through the receiver; and
    c. wherein the first hose coupling of the male element is brought into fluid communication with the female vent aperture of the female element when the male vent aperture is aligned with the female vent aperture by bringing the planar male outlet surface into contact with the planar female outlet surface as the body of the male element is inserted into the channel of the female element.

2. The apparatus of claim 1, wherein the male element comprises a lower contact surface, wherein the female element comprises a terminal contact surface, and wherein the male vent aperture is vertically aligned with the female vent aperture when the lower contact surface contacts the terminal contact surface as the body is inserted into the channel of the receiver.

3. The apparatus of claim 2, wherein the female element comprises a second hose coupling in fluid communication with the female vent aperture.

4. The apparatus of claim 1, wherein the male element comprises a lateral body surface, wherein the female element comprises a lateral channel surface, and wherein the male vent aperture is horizontally aligned with the female vent aperture when the lateral body surface contacts the lateral channel surface.

5. The apparatus of claim 4, wherein the female element comprises an exhaust conduit which is coupled in fluid communication to the female vent aperture.

6. The apparatus of claim 5, wherein the male element comprises a vertical limiter, wherein the female element comprises a limiting surface, and wherein the male vent aperture is vertically aligned with the female vent aperture when the vertical limiter contacts the limiting surface.

7. The apparatus of claim 5, wherein the male element comprises a lower contact surface, wherein the female element comprises a terminal contact surface, and wherein the male vent aperture is vertically aligned with the female vent aperture when the lower contact surface contacts the terminal contact surface as the body is inserted into the channel of the receiver.

8. The apparatus of claim 7, wherein the female element comprises an exhaust conduit which is coupled in fluid communication to the female vent aperture.

9. The apparatus of claim 5, wherein the female element comprises a second hose coupling in fluid communication with the female vent aperture.

10. The apparatus of claim 1, wherein the male element comprises a triangular prism shaped body having a planar male inlet surface and a planar male outlet surface, wherein the planar male inlet surface is angled relative to the planar male outlet surface, wherein the female element comprises a receiver with a triangular prism shaped channel having a planar female inlet surface and a planar female outlet surface, and wherein the planar female inlet surface is angled relative to the planar female outlet surface generally the same angle as the planar male inlet surface is angled relative to the planar male outlet surface of the male element; and wherein the first hose coupling of the male element is brought into fluid communication with the second hose coupling of the female element when the male vent aperture is aligned with the female vent aperture by bringing the planar male outlet surface into contact with the planar female outlet surface as the triangular prism shaped body of the male element is inserted into the triangular prism shaped channel of the female element.

11. A clothes dryer vent quick coupling apparatus, the apparatus comprising:
   a. a male element, wherein the male element comprises:
      a body having a planar male inlet surface and a planar male outlet surface;
      a first hose coupling in fluid communication with a male vent aperture, wherein the first hose coupling is disposed on the male inlet surface of the body, and wherein the male vent aperture extends through the body between the male outlet surface and the first hose coupling;
      a handle coupled to the body, wherein the handle comprises a first upper end and a second lower end, wherein the handle comprises a cavity which is open at the first upper end and joined to the male element at the second lower end, and wherein the cavity is in fluid communication with the male vent aperture; and
   b. a female element, wherein the female element comprises:
      a receiver with a channel having a planar female inlet surface and a planar female outlet surface, wherein the planar female outlet surface is brought into contact with the planar male outlet surface when the body is inserted into the channel;
      a female vent aperture in fluid communication with the female outlet surface, wherein the female vent aperture extends through the receiver; and
   c. wherein the first hose coupling of the male element is brought into fluid communication with the female vent aperture of the female element when the male vent aperture is aligned with the female vent aperture by bringing the planar male outlet surface into contact with the planar female outlet surface as the body of the male element is inserted into the channel of the female element.

12. The apparatus of claim 11, wherein the male element comprises a lower contact surface, wherein the female element comprises a terminal contact surface, and wherein the male vent aperture is vertically aligned with the female vent aperture when the lower contact surface contacts the terminal contact surface as the body is inserted into the channel of the receiver.

13. The apparatus of claim 12, wherein the female element comprises a second hose coupling in fluid communication with the female vent aperture.

14. The apparatus of claim 11, wherein the male element comprises a lateral body surface, wherein the female element comprises a lateral channel surface, and wherein the male vent aperture is horizontally aligned with the female vent aperture when the lateral body surface contacts the lateral channel surface.

15. The apparatus of claim 14, wherein the female element comprises an exhaust conduit which is coupled in fluid communication to the female vent aperture.

16. The apparatus of claim 15, wherein the male element comprises a vertical limiter, wherein the female element comprises a limiting surface, and wherein the male vent aperture is vertically aligned with the female vent aperture when the vertical limiter contacts the limiting surface.

17. The apparatus of claim 15, wherein the male element comprises a lower contact surface, wherein the female element comprises a terminal contact surface, and wherein the male vent aperture is vertically aligned with the female vent aperture when the lower contact surface contacts the terminal contact surface as the body is inserted into the channel of the receiver.

18. The apparatus of claim 17, wherein the female element comprises an exhaust conduit which is coupled in fluid communication to the female vent aperture.

19. The apparatus of claim 15, wherein the female element comprises a second hose coupling in fluid communication with the female vent aperture.

20. The apparatus of claim 11, wherein the male element comprises a triangular prism shaped body having a planar male inlet surface and a planar male outlet surface, wherein the planar male inlet surface is angled relative to the planar male outlet surface, wherein the female element comprises a receiver with a triangular prism shaped channel having a planar female inlet surface and a planar female outlet surface, and wherein the planar female inlet surface is angled relative to the planar female outlet surface generally the same angle as the planar male inlet surface is angled relative to the planar male outlet surface of the male element; and wherein the first hose coupling of the male element is brought into fluid communication with the second hose coupling of the female element when the male vent aperture is aligned with the female vent aperture by bringing the planar male outlet surface into contact with the planar female outlet surface as the triangular prism shaped body of the male element is inserted into the triangular prism shaped channel of the female element.

* * * * *